(12) United States Patent
Fukatsu (10) Patent No.: US 9,340,090 B2
(45) Date of Patent: May 17, 2016

(54) AIR CONDITIONING CONTROL APPARATUS FOR AN ELECTRIC VEHICLE HAVING A PRE-AIR CONDITIONING FUNCTION

(75) Inventor: Hiroki Fukatsu, Anjo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 500 days.

(21) Appl. No.: 13/215,337

(22) Filed: Aug. 23, 2011

(65) Prior Publication Data
US 2012/0047928 A1    Mar. 1, 2012

(30) Foreign Application Priority Data

Aug. 24, 2010  (JP) .................................. 2010-187085

(51) Int. Cl.
  *B60L 1/00* (2006.01)
  *B60H 1/00* (2006.01)
  (Continued)

(52) U.S. Cl.
  CPC ........ *B60H 1/00392* (2013.01); *B60H 1/00428* (2013.01); *B60L 1/003* (2013.01); *B60L 1/02* (2013.01); *B60L 11/1803* (2013.01); *B60L 11/1816* (2013.01); *B60L 11/1838* (2013.01); *B60L 2230/16* (2013.01); *B60L 2240/28* (2013.01); *B60L 2240/34* (2013.01); *B60L 2270/20* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
  CPC ..................... B60H 1/00385; B60H 1/003925; B60H 1/004; B60L 1/003; B60L 11/1838; B60L 2270/20; H02J 2007/0039; Y02T 90/14

USPC .................................... 62/230, 236, 243, 244
See application file for complete search history.

(56) References Cited

U.S. PATENT DOCUMENTS 5,305,613 A * 4/1994 Hotta et al. ..................... 62/209
5,408,842 A * 4/1995 Goto et al. ...................... 62/230
(Continued)

FOREIGN PATENT DOCUMENTS

CN  2628308 Y  7/2004
CN  1611379 A  5/2005
(Continued)

OTHER PUBLICATIONS

Machine translation of JP 2009-107548.*
(Continued)

*Primary Examiner* — Jonathan Bradford
(74) *Attorney, Agent, or Firm* — Birch, Stewart, Kolasch & Birch, LLP (57) ABSTRACT

An air conditioning control apparatus mounted on an electric vehicle having a travel battery that supplies an electric power to a travel driving source, a battery charger that charges the travel battery with a power supply, and an air conditioner that conducts air conditioning in a vehicle interior, controls the air conditioner. When pre-air conditioning is implemented in a state where the battery charger is connected to the power supply, an inrush current generated in a short time when an operation of the air conditioner starts is absorbed by both of power feeding from the power supply and power feeding from the travel battery, and after the inrush current has been absorbed, the air conditioner operates by only the power feeding from the power supply.

11 Claims, 3 Drawing Sheets

(51) Int. Cl.
  *B60L 1/02* (2006.01)
  *B60L 11/18* (2006.01)

(56) References Cited

U.S. PATENT DOCUMENTS

| | | | |
|---|---|---|---|
| 5,428,967 A * | 7/1995 | Goto et al. | 62/230 |
| 5,524,446 A | 6/1996 | Hotta et al. | |
| 5,555,737 A * | 9/1996 | Takeo et al. | 62/230 |
| 5,572,881 A * | 11/1996 | Hotta et al. | 62/278 |
| 5,586,448 A * | 12/1996 | Ikeda et al. | 62/156 |
| 5,595,064 A * | 1/1997 | Ikeda et al. | 62/126 |
| 5,596,261 A * | 1/1997 | Suyama | B60L 11/1803 320/109 |
| 5,656,916 A * | 8/1997 | Hotta | B60L 1/003 180/65.1 |
| 5,796,175 A | 8/1998 | Itoh et al. | |
| 6,178,760 B1 * | 1/2001 | Tanaka et al. | 62/154 |
| 6,662,572 B1 * | 12/2003 | Howard | 62/3.61 |
| 7,475,559 B2 * | 1/2009 | Gleeson | 62/244 |
| 7,531,977 B2 * | 5/2009 | Mazaika | 318/445 |
| 7,839,018 B2 * | 11/2010 | Chen et al. | 307/46 |
| 7,952,231 B1 * | 5/2011 | Zansky et al. | 307/59 |
| 8,061,626 B2 * | 11/2011 | Flick | 236/51 |
| 8,082,743 B2 * | 12/2011 | Hermann et al. | 62/129 |
| 8,118,237 B2 * | 2/2012 | Vyas et al. | 236/46 C |
| 8,274,378 B2 * | 9/2012 | Flick | 340/426.15 |
| 2003/0201097 A1 * | 10/2003 | Zeigler et al. | 165/240 |
| 2004/0194479 A1 * | 10/2004 | Umebayashi et al. | 62/126 |
| 2005/0072175 A1 | 4/2005 | Umeo et al. | |
| 2005/0162017 A1 * | 7/2005 | Chin et al. | 307/44 |
| 2007/0221370 A1 * | 9/2007 | Allen et al. | 165/202 |
| 2009/0064695 A1 * | 3/2009 | Kojima | 62/230 |
| 2009/0064696 A1 | 3/2009 | Perkins | |
| 2009/0133417 A1 * | 5/2009 | Egawa | B60H 1/00735 62/132 |
| 2010/0065627 A1 * | 3/2010 | Outwater | 235/381 |
| 2010/0072953 A1 * | 3/2010 | Mitsutani | 320/152 |
| 2010/0090629 A1 * | 4/2010 | Tang | 318/400.09 |
| 2010/0217491 A1 * | 8/2010 | Naito et al. | 701/49 |
| 2010/0318250 A1 * | 12/2010 | Mitsutani | B60K 1/02 701/22 |
| 2011/0005255 A1 * | 1/2011 | Tanihata | B60H 1/00785 62/238.7 |
| 2011/0046828 A1 * | 2/2011 | Chander et al. | 701/22 |
| 2012/0047928 A1 * | 3/2012 | Fukatsu | 62/150 |

FOREIGN PATENT DOCUMENTS

| | | |
|---|---|---|
| CN | 101086379 A | 12/2007 |
| CN | 101386254 A | 3/2009 |
| CN | 201278210 Y | 7/2009 |
| JP | 5-147420 A | 6/1993 |
| JP | 9-46921 A | 2/1997 |
| JP | 3260040 B2 | 12/2001 |
| JP | 2002-127740 A | 5/2002 |
| JP | 2009-67379 A | 4/2009 |
| JP | 2009-107548 * | 5/2009 |

OTHER PUBLICATIONS

European Search Report issued on Dec. 8, 2011.
Japanese Office Action for JP Patent Application No. 2010-187085 dated Oct. 12, 2012 with English translation.

* cited by examiner

FIG. 4

AIR CONDITIONING CONTROL APPARATUS FOR AN ELECTRIC VEHICLE HAVING A PRE-AIR CONDITIONING FUNCTION

BACKGROUND OF THE INVENTION

The present invention relates to an air conditioning control apparatus that controls the operation of an air conditioner mounted on an electric vehicle.

An air conditioner has been proposed which includes a so-called pre-air conditioning function that operates the air conditioner in advance to conduct air conditioning in a vehicle interior before getting on a vehicle, thereby ensuring comfort when getting on the vehicle. However, when the air conditioner having such a pre-air conditioning function is mounted on an electric vehicle having a travel battery as a travel driving source, the air conditioner implements pre-air conditioning to consume an electric power of the travel battery. Therefore, there is a risk that the amount of charge is reduced to decrease a travel distance. Under the circumstances, in the electric vehicle of this type, there has been proposed that when a battery charger mounted on the electric vehicle charges the travel battery with the use of an electric power supplied from an external power supply, the electric power from the external power supply is supplied to the air conditioner through the battery charger, and the pre-air conditioning is implemented, to thereby suppress a reduction in the amount of charge in the travel battery (refer to JP-A-5-147420).

Incidentally, two types of external power supplies described below are currently used in charging the travel battery for the electric vehicle.
1) A power supply (for example, 100V (15 A), 200V (15 A)) with a relatively small capacity which is supplied to residential outlets
2) A power supply (for example, three-phase 200V (50 kW) with a large capacity which is provided to a quick charger located in a battery charging station.

On the other hand, the air conditioner for the electric vehicle is normally equipped with a compressor that operates with an electric power, and therefore the electric power starts as soon as the air conditioning operation starts. When the electric motor starts, an inrush current several times to some dozens of times as large as a stationary current is generated. Accordingly, when the travel battery is charged by the aid of the former power supply with the relative small capacity, there is a risk that an excessive load is exerted on the residential power supply, for example, if the inrush current of the electric motor exceeds the capacity of the power supply. For that reason, there is a need to replace the capacity of the residential power supply with a large capacity sufficient to absorb the inrush current in advance. If the power supply with such a large capacity cannot be ensured, the pre-air conditioning cannot be conducted. Therefore, there is room for improvement in improving the convenience of a user.

SUMMARY

It is therefore an object of the invention to provide an air conditioning control apparatus that can surely implement pre-air conditioning while suppressing a reduction in the amount of charge in the travel battery even if the power supply with the relatively small capacity located in housings is used, and is advantageous in improvement of convenience and comfort.

In order to achieve the object, according to the invention, there is provided an air conditioning control apparatus mounted on an electric vehicle having a travel battery that supplies an electric power to a travel driving source, a battery charger that charges the travel battery with a power supply, and an air conditioner that conducts air conditioning in a vehicle interior, the air conditioning control apparatus operable to control the air conditioner, wherein, when pre-air conditioning is implemented in a state where the battery charger is connected to the power supply, an inrush current generated in a short time when an operation of the air conditioner starts is absorbed by both of power feeding from the power supply and power feeding from the travel battery, and after the inrush current has been absorbed, the air conditioner operates by only the power feeding from the power supply.

The pre-air conditioning may be implemented when a charge amount condition in which an amount of charge stored in the travel battery is equal to or larger than a predetermined minimum charge amount is satisfied, and, when it is assumed that an amount of feed required for absorbing the inrush current is a maximum feed amount, the predetermined minimum charge amount is a value required to compensate for a deficit resulting from subtracting an amount of feed obtained by the power supply from the maximum feed amount.

The air conditioning control apparatus may include: a communication part that receives a pre-air conditioning instruction transmitted from a mobile device for ordering implementation of the pre-air conditioning in the vehicle interior; and an operation start control unit determines, when the communication part receives the pre-air conditioning instruction, whether a charging condition that the power supply is connected to the battery charger, and a charge amount condition that an amount of charge stored in the travel battery is equal to or larger than a predetermined minimum charge amount are satisfied, the operation start control unit that operates the air conditioner by the power feeding from the power supply and the power feeding from the travel battery to implement the pre-air conditioning, when both of the charging condition and the charge amount condition are satisfied. The operation start control unit may allow the inrush current generated in a short time when the operation of the air conditioner starts to be absorbed by both of the power feeding from the power supply and the power feeding from the travel battery, and allow the air conditioner to operate by only the power feeding from the power supply after the inrush current has been absorbed.

The air conditioning control apparatus may include an operation termination control unit that determines whether a control termination condition required for terminating the operation of the air conditioner is satisfied, during the operation of the air conditioner, and terminates the operation of the air conditioner when determining that the control termination condition is satisfied.

The power supply may be supplied from an outlet disposed in a housing.

The air conditioning control apparatus may further include a defogger control unit that operates a defogger disposed on a glass window of the electric vehicle during implementation of the pre-air conditioning.

DETAILED DESCRIPTION OF EMBODIMENTS

Hereinafter, an embodiment of the present invention will be described with reference to the accompanying drawings.

Figure 1:
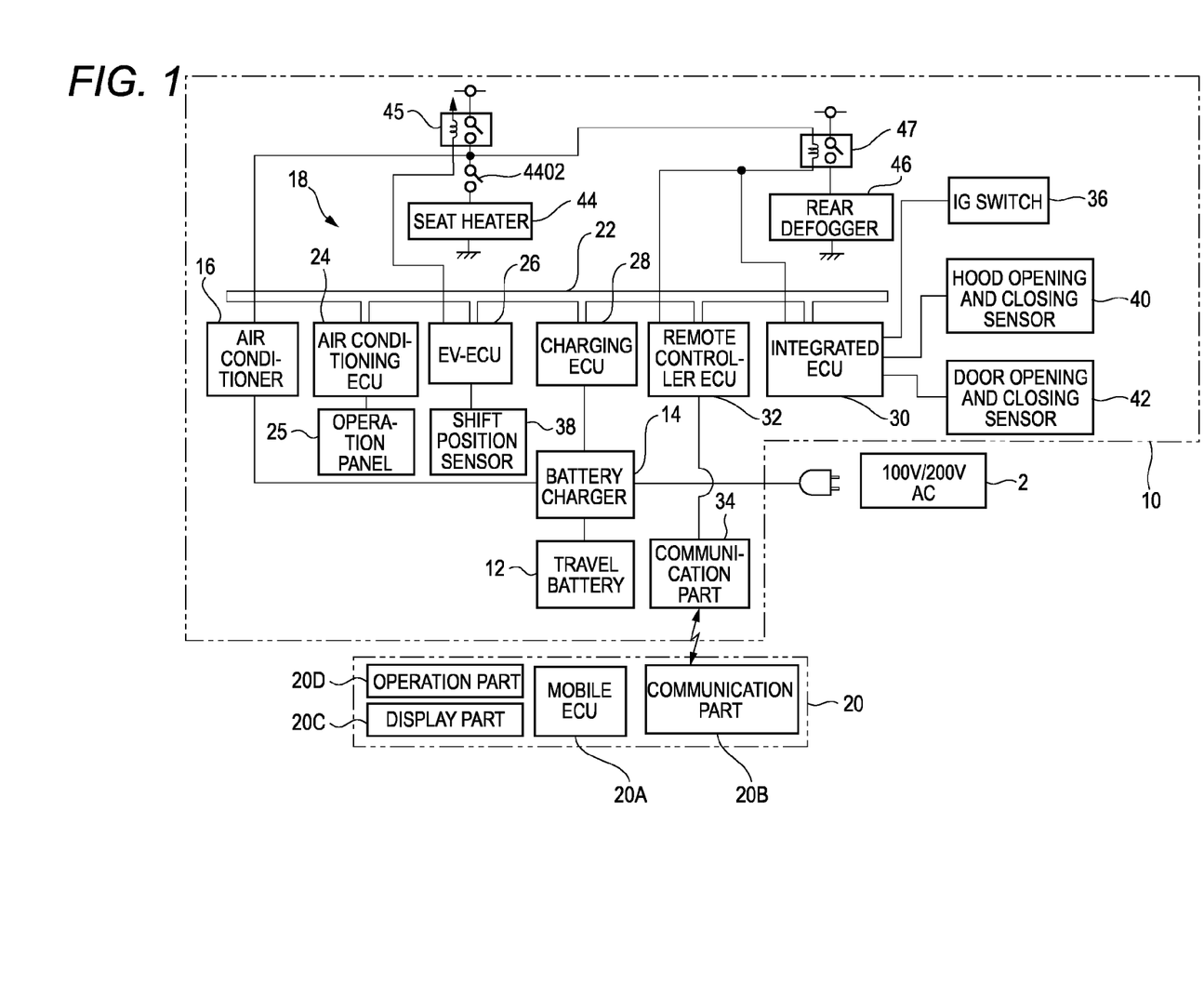
FIG. 1 is a block diagram illustrating a configuration of a control system of an electric vehicle on which an air conditioning control apparatus is mounted, and a mobile device that remotely controls the air conditioning control apparatus according to an embodiment.

As illustrated in FIG. 1, a vehicle 10 is an electric vehicle, and the vehicle 10 has a travel battery 12, a battery charger 14, an air conditioner 16, and an air conditioning control apparatus 18 of the present invention mounted thereon.

Figure 2:
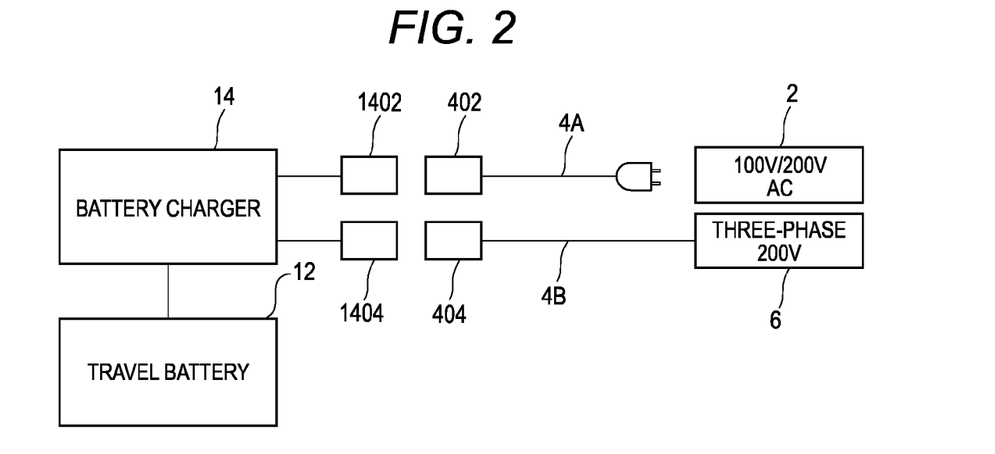
FIG. 2 is an illustrative diagram of a case in which a battery charger, a power supply, and a quick charge power supply are connected to each other.

The travel battery 12 supplies an electric power to an electric motor that is a travel driving source not shown, and configures a high voltage power supply. The battery charger 14 charges the travel battery 12 with the use of a power supply 2. In this embodiment, as illustrated in FIG. 2, the battery charger 14 includes a first incoming connector 1402 for normal charging, and a second incoming connector 1404 for quick charging. The first incoming connector 1402 for normal charging is connected to an incoming connector 402 of a dedicated charging cable 4A connected to an outlet of the housing. The second incoming connector 1404 is connected to an incoming connector 404 of a dedicated charging cable 4B connected to a quick charging power supply 6 with a high-voltage large capacity disposed in a dedicated charging station. The battery charger 14 detects that a power supply, that is, AC100V or AC200V is applied to the first incoming connector 1402, and conducts normal charging at a normal charging rate. In the normal charging, a charging time required to fully charge the travel battery 12 is, for example, about 14 hours (100V) or about 7 hours (200V). Also, the battery charger 14 detects that a voltage across the quick charging power supply 6 is applied to the second incoming connector 1404, and quickly charges the travel battery 12 with the use of the quick charging power supply 6 at a charging rate higher than the normal charging rate. In the quick charging, a charging time required to charge the travel battery 12 to 80% of the charging capacity is shorter than that of the normal charging, for example, about 30 minutes.

Figure 3:
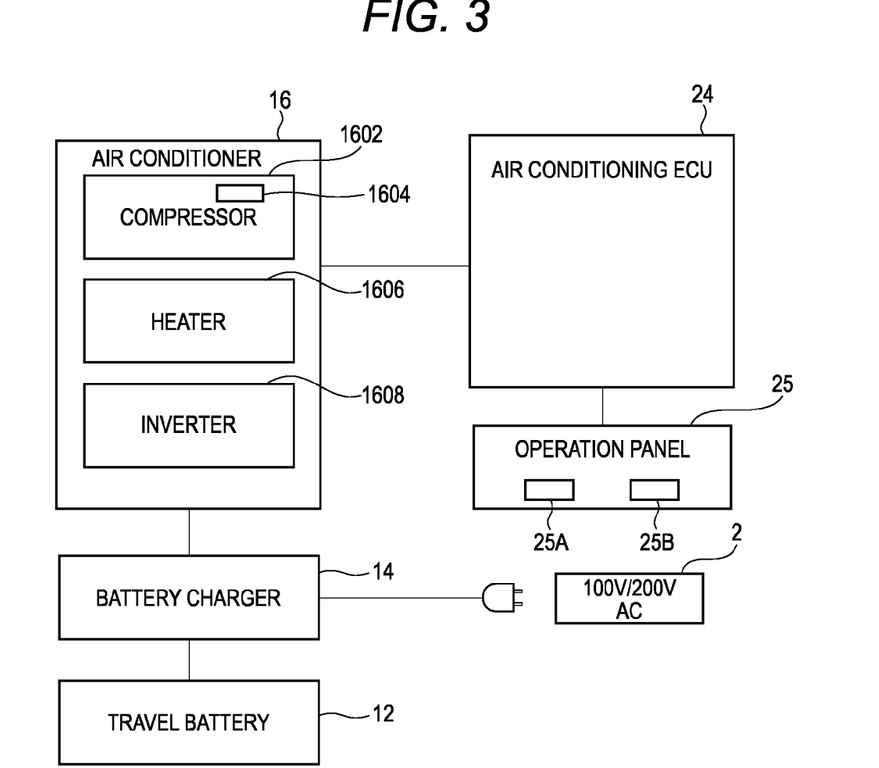
FIG. 3 is a block diagram illustrating a peripheral configuration of an air conditioner and an air conditioner ECU.

The air conditioner 16 includes a compressor 1602 for cooling, a hot-water heater 1606 for heating, an inverter 1608 that supplies an electric power to the compressor 1602 and the heater 1606 on the basis of the electric power supplied from the battery charger 14, a sensor not shown which detects a temperature in the vehicle interior, and a blower fan not shown which blows air. The compressor 1602 includes an electric motor 1604 for driving, and the electric motor 1604 starts as soon as the air conditioner 16 starts air conditioning operation (cooling), whereby the inrush current several times to some dozens of times as large as the stationary current is generated. A configuration of the air conditioner 16 is not limited to this configuration, but may be arbitrarily configured, for example, by conducting a so-called heat pump system that conducts both of cooling and heating by the aid of the compressor 1602.

Prior to description of the air conditioning control apparatus 18, a mobile device 20 that remotely controls the air conditioning control apparatus 18 for pre-air conditioning will be described. In this embodiment, the mobile device 20 includes a mobile ECU 20A, a communication part 20B, a display part 20C, and an operation part 20D. The mobile device 20 transmits and receives information through radio communication with respect to a communication part 34 mounted on a vehicle 10, which will be described later, under the control of the mobile ECU 20A. The display part 20C displays characters, icons, and images according to a display signal supplied from the mobile ECU 20A. In this embodiment, the communication part 34 of the vehicle 10 notifies the communication part 20B of the mobile device 20 termination information indicative of termination of pre-air conditioning and the reason of the termination, which will be described later, the mobile ECU 20A displays the termination information on the display part 20C. The operation part 20D is formed of, for example, plural operation switches, and supplies an operation signal to the mobile ECU 20A according to the operation of the operation switch. The operation switch is arbitrarily configured, for example, a touch panel disposed in the display part 20C. The mobile ECU 20A includes a CPU, a ROM that stores a control program therein, a RAM as an operation region of the control program, and an interface part that interfaces peripheral circuits. The mobile ECU 20A operates by execution of the control program. A remote control of the air conditioner 16 is conducted by transmitting a pre-air conditioning instruction from the communication part 20B to the communication part 34 configuring a part of the air conditioning control apparatus 18, through the operation of the operation part 20D. In this embodiment, the pre-air conditioning instruction includes information prescribing operation conditions as to whether pre-air conditioning is conducted in a heating mode or a cooling mode, and whether defogger, which will be described later, is further conducted, or not. The prescription of the above operation conditions is conducted by displaying an operation menu on the display part 20C by the operation of the operation part 20D, moving a cursor by the operation of the operation part 20D, selecting any one of items displayed in the operation menu, and conducting decision operation. In more detail, mode menus of AUTO, COOL, HEAT, DEFORGGER, and OFF are set in the mobile device 20. In the pre-air conditioning, the setting at the mobile device 20 is prioritized over the setting on an operation panel 25 in the vehicle interior. Also, the pre-air conditioning instruction is conducted by operating the operation part 20D after the above operation conditions are prescribed. The mobile device 20 also has a function of an electronic key of the vehicle, but its detailed description will be omitted.

Subsequently, the air conditioning control apparatus 18 will be described. As illustrated in FIG. 1, in the vehicle 10 are mounted the travel battery 12, the battery charger 14, and the air conditioner 16 as well as an air conditioning ECU 24, an EV-ECU 26, a charging ECU 28, an integrated ECU 30, a remote controller ECU 32, the communication part 34, an IG switch 36, a shift position sensor 38, a hood opening and closing sensor 40, a door opening and closing sensor 42, a seat heater 44, and a rear defogger 46. The air conditioning control apparatus 18 includes the air conditioning ECU 24, the EV-ECU 26, the charging ECU 28, the integrated ECU 30, the remote controller ECU 32, the communication part 34, the IG switch 36, the shift position sensor 38, the hood opening and closing sensor 40, and the door opening and closing sensor 42.

Each of the air conditioning ECU 24, the EV-ECU 26, the charging ECU 28, the remote controller ECU 32, and the integrated ECU 30 includes a CPU, a ROM that stores a control program therein, a RAM as an operation region of the control program, and an interface part that interfaces peripheral circuits. Each ECU operates by execution of the control program. Also, the air conditioning ECU 24, the EV-ECU 26, the charging ECU 28, the remote controller ECU 32, and the integrated ECU 30 are connected to each other through a bus 22 indicated by a double line in FIG. 1, so as to deliver information to each other. The bus 22 includes a CAN (controller area network) bus 22, and a bus lower in level than the CAN bus 22. The EV-ECU 26 is connected with the shift position sensor 38, and the integrated ECU 30 is connected with the IG switch 36, the hood opening and closing sensor 40, and the door opening and closing sensor 42.

As illustrated in FIG. 3, the air conditioning ECU 24 controls the air conditioner 16 so that a room temperature reaches a set temperature. More specifically, the air conditioning ECU 24 controls the inverter 1608 and the blower fan on the basis of the detection result of the above sensor. The air conditioning ECU 24 is connected with the operation panel 25 disposed at an appropriate place in the vehicle interior. The operation panel 25 includes an operation part 25A and a display part 25B. The operation part 25A includes operation switches for conducting changeover of cooling and heating, temperature setting, airflow setting, changeover of blast modes such as FACE, FOOT, and DEF, and changeover of inside and outside air. The display part 25B displays the operation conditions of the air conditioner 16 (stop, cooling, heating), and the above set contents by the aid of characters or icons. The operation part 25A and the display part 25B are also controlled by the air conditioning ECU 24.

The EV-ECU 26 electronically controls the entire vehicle 10. In this embodiment, the EV-ECU 26 has a function of supplying a control signal to an input terminal of an air conditioning relay 45 that controls on and off of a power supply of the air conditioner 16. Also, the air conditioning relay 45 also has a function of a seat heater relay that controls operation and non-operation of the seat heaters 44 disposed in a driver's seat and a passenger seat. That is, when the EV-ECU 26 enables the above control signal, an output terminal of the air conditioning relay 45 is closed, the power supply of the air conditioner 16 turns on, and the seat heater 44 operates. A manual switch 4402 renders the function of the seat heater 44 disposed at an appropriate place in the vehicle interior, valid or invalid. The seat heater 44 can operate only when the manual switch 4402 is closed. A power supply supplied to the seat heater 44 through the output terminal of the air conditioning relay 45 is supplied from an accessary battery not shown.

The charging ECU 28 controls the operation of charging the travel battery 12 through the battery charger 14. Also, the charging ECU 28 monitors the amount of charge in the travel battery 12 through the battery charger 14, and calculates a ratio of the amount of charges to a full charge of 100%. Also, the charging ECU 28 controls the battery charger 14 to selectively use, as an electric power to be supplied to the air conditioner 16, both the electric powers of the power supply 2 and the travel battery 12, the electric power of only the power supply 2, or the electric power of only the travel battery 12.

The integrated ECU 30 controls various accessories mounted on the vehicle 10.

In this embodiment, the integrated ECU 30 has a function of supplying the control signal to an input terminal of a rear defogger relay 47 that control the operation and non-operation of the rear defogger (heater) 46 for fog removal, which is disposed on a rear glass. That is, when the integrated ECU 30 renders the above control signal valid, an output terminal of the relay 47 is closed, and the rear defogger 46 operates. In this example, the output terminal of the air conditioning relay 45 is connected to the input terminal of the rear defogger relay 47. Accordingly, the rear defogger relay 47 can operate only when the air conditioning relay 45 is closed. That is, the rear defogger 46 can operate. An electric power to be supplied to the rear defogger 46 through the output terminal of the rear defogger relay 47 is supplied from an accessary battery not shown. Also, in this example, the rear defogger 46 disposed on the rear glass will be described. However, the same configuration can be also applied to defoggers disposed on glass windows other than the rear glass.

The communication part 34 transmits and receives information through radio communication with respect to the communication part 20B of the mobile device 20 under the control of the remote controller ECU 32. The remote controller ECU 32 executes control operation, which will be described later, upon receiving the pre-air conditioning instruction transmitted from the mobile device 20 through the communication part 34.

The IG switch 36 detects switching positions of OFF, ACC (accessary usable position), and ON (vehicle 10 travelable position). The shift position sensor 38 detects a position of a shift lever. The hood opening and closing sensor 40 detects an open and close state of a hood that opens and closes an engine room. The door opening and closing sensor 42 detects an open and close state of doors disposed in the vehicle 10. The position of the IG switch 36, and the detection results of the hood opening and closing sensor 40 and the door opening and closing sensor 42 are supplied to the remote controller ECU 32 through the integrated ECU 30 via the bus 22. The detection result of the shift position sensor 38 is supplied to the remote controller ECU 32 through the EV-ECU 26 via the bus 22.

Figure 4:
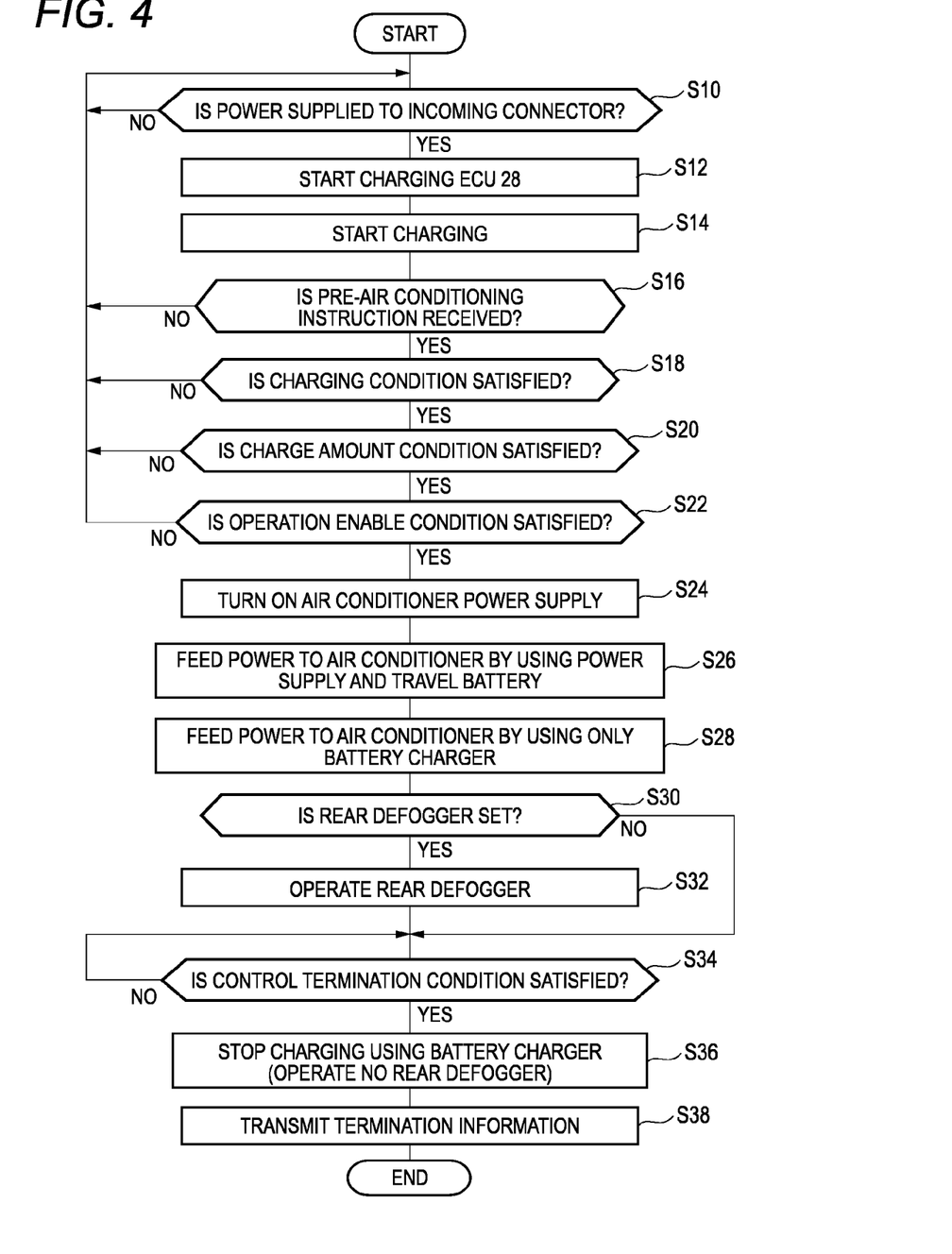
FIG. 4 is a flowchart of the operation of the air conditioning control apparatus.

Subsequently, the operation of the air conditioning control apparatus 18 will be described with reference to a flowchart of FIG. 4. In the following example, there is described a case in which after a parked vehicle 10 starts to be charged with the power supply 2, a user transmits a pre-air conditioning instruction by the aid of the mobile device 20. When the power supply 2 or a quick charging power supply 6 is connected to the first and second incoming connectors 1402 and 1404, the battery charger 14 detects this connection and supplies a start signal to the charging ECU 28 (Step S10). Upon receiving the start signal, the charging ECU 28 starts from a sleep state (Step S12). Then, the charging ECU 28 controls the battery charger 14, and charges the travel battery 12 with the power supply 2 or the quick charging power supply 6 (Step S14). On the other hand, the remote controller ECU 32 monitors whether the pre-air conditioning instruction transmitted from the integrated ECU 30 has been received, or not (Step S16).

If the pre-air conditioning instruction has been received, the remote controller ECU 32 determines whether a charging condition that the travel battery 12 is charged by the battery charger 14 is satisfied, or not (Step S18). More specifically, the remote controller ECU 32 determines whether the charging condition is satisfied, or not, on the basis of information on the operation condition of the battery charger 14, which is obtained from the charging ECU 28 through the bus 22. In this embodiment, the remote controller ECU 32 determines that the charging condition is satisfied if the charging operation is executed by the aid of the power supply 2. The remote controller ECU 32 determines that the charging condition is not satisfied if the charging operation is executed by the aid of the quick charging power supply 6. That is, when the first incoming connector 1402 and the incoming connector 402 are connected each other to start the charging ECU 28, that is, when the power supply 2 is connected to the battery charger 14 to satisfy the charging condition, even if the charging operation has been completed, the satisfaction of the conditions is maintained if the first incoming connector 1402 and the incoming connector 402 are connected to each other. When the quick charging power supply 6 is used, the pre-air conditioning is not conducted. The reason is that since the travel battery 12 produces heat during the quick charging operation, the travel battery 12 is cooled by the aid of the air conditioner 16.

If the charging condition is satisfied, the remote controller ECU 32 determines whether a charge amount condition that the amount of charge stored in the travel battery is equal to or larger than a predetermined minimum charge amount is satisfied, or not (Step S20). More specifically, the remote controller ECU 32 determines whether the charge amount condition is satisfied or not, on the basis of whether the amount of charge in the travel battery, which is obtained from the charging ECU 28 via the bus 22, is equal to or larger than the minimum charge amount, or not. The minimum charge amount can be set as described below. That is, when the amount of feed required for absorbing the inrush current is a maximum feed amount, the minimum charge amount is set to a value required to compensate for a deficit obtained by subtracting the amount of feed obtained by the power supply 2 from the above maximum feed amount.

If the charging condition is satisfied, the remote controller ECU 32 determines whether operation enable conditions required for allowing the air conditioner 16 to execute the air conditioning are satisfied, or not (Step S22). The operation enable conditions are exemplified, for example, the following conditions. If all of the following conditions are satisfied, the operation enable condition is satisfied.
1) The IG switch 36 is at an OFF position.
This is because the vehicle 10 needs to be parked while charging.
2) The shift position detected by the shift position sensor 38 is P (parking).
This is because the vehicle 10 needs to be parked while charging.
3) The open and close state of the hood, which is detected by the hood opening and closing sensor 40 is closed.
This is because safety against the fan of the air conditioner 16, which operates within the engine room, is ensured by closing the hood.
4) All of the open and close states of the doors of the vehicle 10, which are detected by the door opening and closing sensor 42, are closed.
This is because the air conditioning by the air conditioner 16 is made effective.

If the conditions are not satisfied in Steps S18, S20, and S22, the processing is returned to Step S10.

If all of the three conditions of the charging condition, the charge amount condition, and the operation enable conditions are satisfied, the remote controller ECU 32 turns on the air conditioning relay 45 through the EV-ECU 26. Then, the remote controller ECU 32 controls the battery charger 14 to feed electric power to the air conditioner 16 with the use of the power supply 2 and the travel battery 12 (Step S26). As a result, an inrush current generated in a short time when the operation of the air conditioner 16 starts is absorbed by both of power feeding from the power supply and power feeding from the travel battery. Then, after the inrush current has been absorbed, the remote controller ECU 32 controls the battery charger 14 to feed electric power to the air conditioner 16 with the use of only the power feeding from the power supply 2 (Step S28). In this case, the remote controller ECU 32 supplies the operation contents such as heating, cooling, and dehumidification included in the pre-air conditioning instruction received from the mobile device 20 to the air conditioning ECU 24. The remote controller ECU 12 controls the air conditioner 16 on the basis of the supplied operation contents. As a result, the pre-air conditioning is implemented. When the air conditioning relay 45 turns on in Step S24, the seat heater 44 operates if the manual switch 4402 is on.

Further, the remote controller ECU 32 determines whether the mode at the time of starting the pre-air conditioning, which is received from the mobile device 20, is set to a DEFOGGER mode, or not (Step S30). If the determination is yes, the remote controller ECU 32 instructs the integrated ECU 30 to execute the defogger operation whereby the integrated ECU 30 turns on the rear defogger 46 to execute the operation of the rear defogger 46 (Step S32). Then, the remote controller ECU 32 determines whether a control termination condition required for terminating the operation of the air conditioner 16 is satisfied, or not, during the operation of the air conditioner 16 (Step S34). The control termination condition is exemplified by, for example, the following conditions, and if at least one of the following conditions is satisfied, the control termination condition is satisfied.
1) A stop instruction for stopping the pre-air conditioning, which is transmitted from the mobile device 20, is received by the communication part 34.
2) At least one of the above operation enable conditions is not satisfied.
3) A predetermined time elapses. This is because the consumption of the travel battery 12 is suppressed.
4) A defect occurring in a control system of the vehicle 10 is detected.

If the remote controller ECU 32 determines that the control termination condition is satisfied, the remote controller ECU 32 terminates the operation of the air conditioner 16 (Step S36). More specifically, the remote controller ECU 32 turns off the air conditioning relay 45 through the EV-ECU 26. As a result, power feeding from the travel battery 12 to the air conditioner 16 stops. In this situation, if the rear defogger 46 operates, the rear defogger 46 does not also operate because the air conditioning relay 45 turns off.

The remote controller ECU 32 transmits termination information including a fact that the pre-air conditioning has been terminated and a reason why the pre-air conditioning has been terminated, to the mobile device 20 through the communication part 34 (Step S38). The reason of termination may be information indicative of the contents corresponding to the respective control termination conditions, which is exemplified by, for example, the following information.
1) The pre-air conditioning stops in response to an instruction for stopping the mobile device 20.
2) Because the pre-air conditioning time exceeds a predetermined value, the pre-air conditioning stops.
3) Because a defect is detected in the vehicle, the pre-air conditioning stops. In the case of 3), there are the following reasons. A defect occurring in the control system of the vehicle 10 is detected. The IG switch 36 is out of the OFF position. The shift position is out of P (parking). The hood is opened. The door is opened.

In this embodiment, an operation start control unit is configured by the remote controller ECU 32 that executes Steps S16 to S28. Also, an operation termination control unit is configured by the remote controller ECU 32 that executes Steps S34 and S36. Also, a defogger control unit is configured by the remote controller ECU 32 that executes Steps S30, S32, and S36.

According to this embodiment, if all of the three conditions of the charging condition, the charge amount condition, and the operation enable conditions are satisfied, the air conditioner 16 operates due to power feeding from the power supply 2 and power feeding from the travel battery 12 to implement the pre-air conditioning. In this situation, an inrush current generated in a short time when the operation of the air conditioner 16 starts is absorbed by both of power feeding from the power supply 2 and power feeding from the travel battery 12. Then, after the inrush current has been absorbed, the air conditioner 16 operates by only the power feeding from the power supply 2. Accordingly, even if the power supply with the relatively small capacity located in housings is used, the pre-air conditioning can be surely implemented while suppressing a reduction in the amount of charge in the travel battery without exerting an excessive load on the residential power supply, and convenience and comfort are advantageously improved. Also, in this embodiment, since the defogger disposed in the glass window of the vehicle operates during implementation of the pre-air conditioning, fog on the glass window can be removed before getting on the vehicle, and therefore convenience and comfort are further advantageously improved.

What is claimed is:

1. An air conditioning control apparatus mounted on an electric vehicle having a travel battery that supplies an electric power to a travel driving source, a battery charger that charges the travel battery with an external power supply, and an air conditioner that conducts air conditioning in a vehicle interior, the air conditioning control apparatus operable to control the air conditioner, the air conditioning control apparatus, comprising:
    a processor; and
    a storage unit that stores a program, that implements pre air conditioning, executed by the processor,
    the program causes the processor to:
    (a) determine that the battery charger is connected to the external the power supply;
    (b) determine whether a charge amount condition in which an amount of charge stored in the travel battery is equal to or larger than a predetermined minimum charge amount, process (b) including, when an amount of power feed required for absorbing the inrush current is a maximum power feed amount, obtaining the predetermined minimum charge amount required to compensate for a deficit by subtracting an amount of power feed obtained by the power supply from the maximum power feed amount;
    (c) when (a) and (b) are satisfied, power feed, to the air conditioner, simultaneously from the power supply and from the travel battery only for a time period during which an inrush current is generated to absorb the inrush current; and
    (d) after the inrush current has been absorbed, cause the power to be fed to the air conditioner only from the power supply.

2. The air conditioning control apparatus according to claim 1, further comprising:
    a communication part that receives a pre-air conditioning instruction transmitted from a mobile device for ordering implementation of the pre-air conditioning in the vehicle interior.

3. The air conditioning control apparatus according to claim 2, wherein
    the program causes the processor to determine whether a control termination condition required for terminating the operation of the air conditioner is satisfied, during the operation of the air conditioner, and terminate the operation of the air conditioner when determining that the control termination condition is satisfied.

4. The air conditioning control apparatus according to claim 1, wherein the power supply is supplied from an outlet disposed in a housing.

5. The air conditioning control apparatus according to claim 2, wherein the power supply is supplied from an outlet disposed in a housing.

6. The air conditioning control apparatus according to claim 3, wherein the power supply is supplied from an outlet disposed in a housing.

7. The air conditioning control apparatus according to claim 1, further comprising:
    a defogger control unit that operates a defogger disposed on a glass window of the electric vehicle during implementation of the pre-air conditioning.

8. The air conditioning control apparatus according to claim 2, further comprising:
    a defogger control unit that operates a defogger disposed on a glass window of the electric vehicle during implementation of the pre-air conditioning.

9. The air conditioning control apparatus according to claim 3, further comprising:
    a defogger control unit that operates a defogger disposed on a glass window of the electric vehicle during implementation of the pre-air conditioning.

10. The air conditioning control apparatus according to claim 4, further comprising:
    a defogger control unit that operates a defogger disposed on a glass window of the electric vehicle during implementation of the pre-air conditioning.

11. An air conditioning control apparatus mounted on an electric vehicle having a travel battery that supplies an electric power to a travel driving source, a battery charger that charges the travel battery with an external power supply, and an air conditioner that conducts air conditioning in a vehicle interior, the air conditioning control apparatus operable to control the air conditioner, the air conditioning control apparatus, comprising:
    a processor; and
    a storage unit that stores a program, that implements pre-air conditioning, executed by the processor,
    the program causes the processor to:
    (a) determine whether pre-air conditioning is implemented in a state where the battery charger is connected to the external power supply;
    (b) determine whether a charge amount condition in which an amount of charge stored in the travel battery is equal to or larger than a predetermined minimum charge amount, process (b) including, when an amount of power feed required for absorbing the inrush current is a maximum power feed amount, obtaining the predetermined minimum charge amount required to compensate for a deficit by subtracting an amount of power feed obtained by the power supply from the maximum power feed amount;
    (c) determine whether an operation enable condition including a condition that the electric vehicle has been parked is satisfied;
    (d) when (a)-(c) are satisfied, power feed to the air conditioner, simultaneously from the power supply and from the travel battery only for a time period during which an inrush current is generated to absorb the inrush current, and
    (e) after the inrush current has been absorbed, cause the power to be fed to the air conditioner only from the power supply, wherein
    the operation enable condition includes at least one of,
        determining that an ignition switch is at an OFF position,
        determining that a shift position of a transmission is in a parking position,
        a condition of determining that a hood of the electric vehicle is closed, and a condition of determining that all doors of the electric vehicle are closed.

* * * * *